No. 814,164. PATENTED MAR. 6, 1906.
J. F. RAU.
RESILIENT VEHICLE TIRE.
APPLICATION FILED SEPT. 19, 1904.
2 SHEETS—SHEET 2.
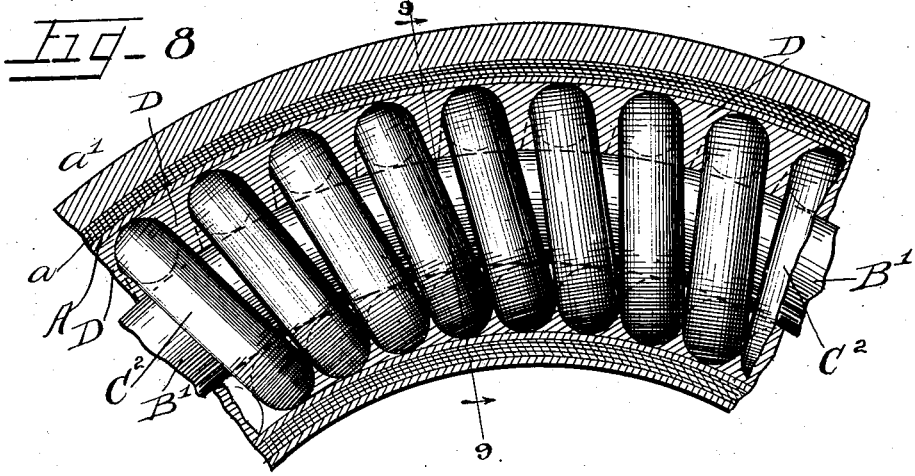
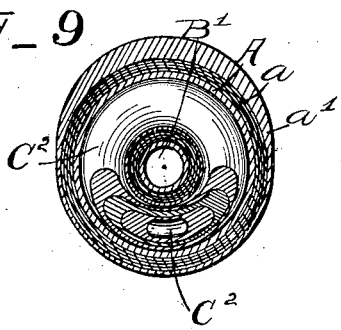
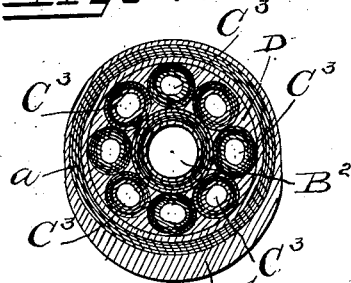
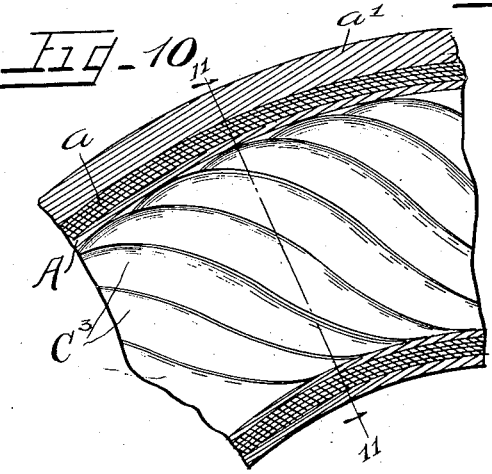
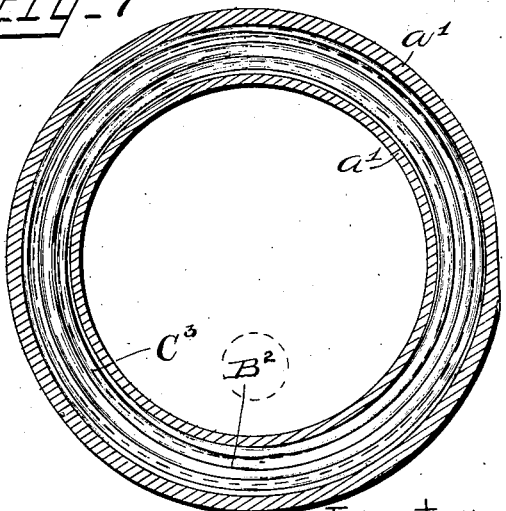
Witnesses
J. W. Angell
W. W. Witherbury
Inventor
John F. Rau.
by Charles W. Hills, Atty.

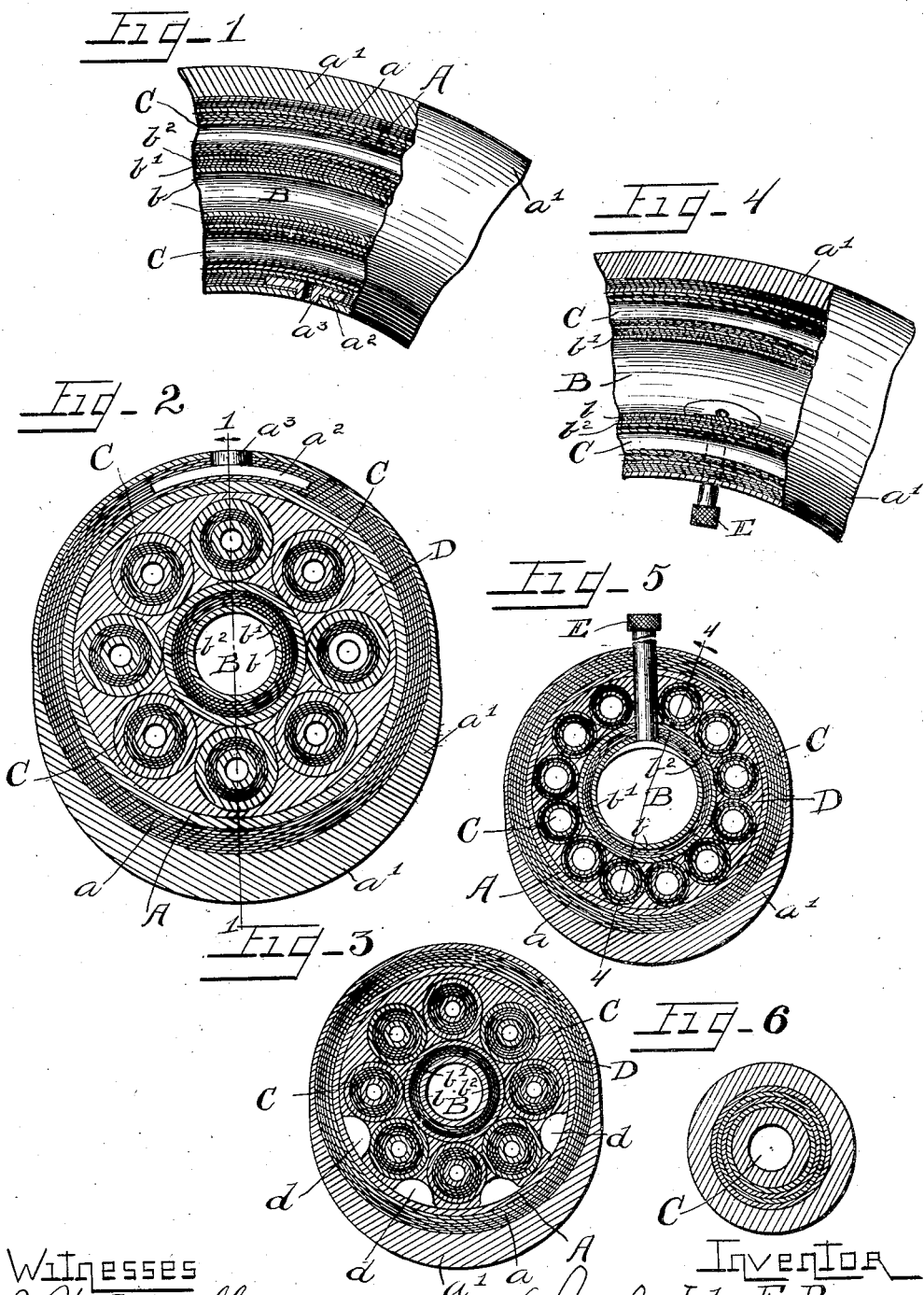

UNITED STATES PATENT OFFICE.

JOHN F. RAU, OF CHICAGO, ILLINOIS, ASSIGNOR OF ONE-HALF TO JOHN F. CORDES, OF CHICAGO, ILLINOIS.

RESILIENT VEHICLE-TIRE.

No. 814,164.  Specification of Letters Patent.  Patented March 6, 1906.

Application filed September 19, 1904. Serial No. 224,993.

*To all whom it may concern:*

Be it known that I, JOHN F. RAU, a citizen of the United States, and a resident of the city of Chicago, county of Cook, and State of Illinois, have invented certain new and useful Improvements in Resilient Vehicle-Tires; and I do hereby declare that the following is a full, clear, and exact description of the same, reference being had to the accompanying drawings, and to the letters of reference marked thereon, which form a part of this specification.

This invention relates to improvements in resilient vehicle-tires, and more particularly to a vehicle-tire of rubber or equivalent material.

Heretofore rubber vehicle-tires have been constructed in three general types: first, a solid or cushion tire; second, the so-called "single-tube" or "hose-pipe" tires, and, third, the double-tube tire to which the clencher-tires belong. These tires have been used for various purposes with greater or less success, dependent upon the service required and the road upon which the same are to be used. Each has certain objectionable features or disadvantages and all possess some advantageous qualities. For example, while the solid or cushion tire is a noiseless tire for carriages or commercial vehicles of certain kinds the same are not capable of adapting themselves to even the slight inequalities of the roadway sufficiently to carry the load without vibration. The single-tube or hose-pipe tire, while to a greater or less extent free from the objection above noted, are subject to the grave objection that they are easily punctured, and in that case are usually not so easily repaired, and, furthermore, must be made of a good quality of rubber, thus becoming expensive. On the other hand, the third class—viz., the double tire—while possessing great resiliency and molding to the surface of the road very readily, thereby producing but very slight vibration, have usually been difficult to secure upon the rim with sufficient rigidity and are also readily punctured, in which case the tire must be removed and the injury repaired or the vehicle endangered.

The object of this invention is to provide a rubber tire for vehicle-wheels possessed with all the advantages of each of the three classes of tires before named and one that is practically puncture-proof.

It is also an object of this invention to provide a construction in which the resiliency of the tire can be varied by the operator to suit the load requirements and in which the tire is so constructed to afford maximum wearing qualities with reasonable weight.

It is a further object of this invention to so construct the tire as to require the use of but a minimum quantity of high-grade rubber, thereby enabling a lower or cheaper grade of rubber to be employed with equally as satisfactory results.

The invention consists in the matters hereinafter described, and more fully pointed out and defined in the appended claims.

In the drawings, Figure 1 is a fragmentary vertical section of a tire embodying my invention, showing parts of the same in elevation. Fig. 2 is an enlarged transverse section of the same. Fig. 3 is a reduced section similar to Fig. 2, but showing a slightly-modified construction of the core. Fig. 4 is a view similar to Fig. 1 and illustrates the position of the air-valves. Fig. 5 is a transverse section of the same, showing the air-valves in elevation. Fig. 6 is an enlarged transverse section of one of the tubes in said core. Fig. 7 is a reduced transverse section of the tire, showing the core in elevation. Fig. 8 is an enlarged vertical section of the tire, showing a part of the core in side elevation and illustrating a spiral arrangement of one of the tubes. Fig. 9 is a section taken on line 9 9 of Fig. 8. Fig. 10 is a similar fragmentary section, showing a plurality of the smaller tubes wound spirally about the central tube. Fig. 11 is a reduced section taken on line 11 11 of Fig. 10.

As shown in said drawings, said tire comprises an outer tubular casing having vulcanized or otherwise rigidly secured therein a core comprising a relatively large central tube having arranged around the same other tubes of less diameter, which approximately fill the space between the outer casing and the inner tube. Said outer casing, as shown, comprises an inner layer A of a good quality of rubber or other suitable material, about which is wrapped a plurality of layers of strong canvas or fabric, (indicated by *a*,) which of course may be of any desired thickness. An outer layer of high-grade rubber (indicated by $a'$) invests said fabric and is made thicker at the periphery to afford a thickened tread portion, as is usual. Means are provided for attaching the tire to a rim comprising struts $a^2$, vulcanized into said casing between the layers of canvas, as shown in Figs. 1 and 2, each of which is provided with an outwardly-extended internally-threaded nipple $a^3$, adapted to be engaged by the adjusting-bolts, whereby the tire is held in place on the rim. Within and filling said casing and vulcanized thereto is a core comprising an inner or central tube B, having an inner layer of rubber $b$, an investing fabric of canvas $b'$ wound a plurality of times about the same, and an outer layer of rubber $b^2$, as shown in Fig. 2. Arranged around said inner tube is one or more smaller tubes C, constructed as before described with reference to tube B and which are conveniently of a diameter equal to the distance between the outer side of the tube B and the inner layer A of the casing. Said tubes B and C are secured in said casing with a quantity of rubber D, which in vulcanizing fills all the spaces between said tubes and vulcanizes the same together and to the outer casing. If preferred, a portion of said rubber D may be omitted between adjacent tubes C and the inner layer A of the casing at the tread of the tire, thus affording peripheral channels $d$ within the tire above the tread portion, which are useful, inasmuch as they increase the resiliency of the tire, especially when used on the lighter vehicles.

If preferred, the inner tube B may be made inflatable, thus rendering the tire capable of being inflated to withstand any desired pressure and permitting the resiliency of the tire to be varied at the will of the operator. The tire for this purpose is constructed as before described, and the central tube B may of course be made of any desired size. An air-valve is inserted into the tire to open into said central tube, affording means for inflating the same.

In the construction in Fig. 9 the outer casing is constructed as before described, as is also the tube $B'$, corresponding with the tube B. Extending around said tube in a spiral form is a tube $C^2$, similar to the tube C, before described, except, as shown, it is wound in a relatively close spiral about said tube $B'$ and is vulcanized thereto by the filling-rubber D, before described. This affords a spiral passage through the core and a central passage extending through the axis of the spiral.

In the construction illustrated in Figs. 10 and 11 the outer casing is constructed as before described, and about the inner tube is spirally wound a plurality of tubes $C^3$, which approximately fill the space between the inner tube $B^2$ and the casing before described.

The operation is as follows: A core such as described is secured in place in the casing and vulcanized therein, thus reducing the same to a unitary structure. The wrappings of canvas or other fabric surrounding the middle tube or the tubes between the same and the casing may be of any desired thickness and may vary in thickness in different tires to vary the resiliency or the resistance of the tire to compression. For the same reason said tubes may be made in different sizes, if preferred, the tire being of considerable thickness and the resiliency being imparted largely by the construction of said core. The tire may be used either with or without inflating. For heavier service, however, the inner tube may be inflated, thus forming a hose-pipe tire, in which the thickness of the treads is so great as to preclude possibility of punctures by ordinary causes and in which the arrangement of the smaller tubes around the same is such as to deflect any pointed instrument from reaching the inner tube to puncture the same.

By the construction described it is obvious that any desired degree of resiliency can be obtained by a tire embodying my invention, and it is also evident that the tire may be constructed either by employing a plurality of non-communicating small tubes arranged to inclose said large tube B or $B'$ or a smaller tube made in one piece may be coiled about the inner tube, a shown in Figs. 7 to 11, inclusive. Obviously the size of said tubes may vary with respect to each other, if preferred, the inner tube may be made smaller than the intermediate tube, and any method of attaching the tire to a rim may be employed, as may also the exterior conformation of the tire.

Obviously I have not described all the possible constructions embodying my invention, and I therefore do not purpose to limit myself in this application otherwise than necessitated by the prior art and as stated in the claims, as obviously many details of construction may be varied without departing from the principle of my invention.

I claim as my invention—

1. A vehicle-tire comprising an outer casing, a core integrally united therein comprising a central tube and a plurality of tubes extending around the same, each of said tubes being composed of a plurality of flexible layers.

2. In a rubber tire for vehicle-wheels, a core vulcanized therein and filling the same, and comprising an inner and an outer central tube, a plurality of layers of canvas intermediate said tubes and a plurality of tubes about said outer tube.

3. A tire comprising an outer and an inner tubular casing, layers of fabric therebetween, a core within the casing comprising a plurality of tubes running longitudinally of the tire, each having a central layer of fabric, said tubes being vulcanized together.

4. A tire comprising a core having a plurality of tubes extending therethrough longitudinally, one of the same lying at the center, the others thereof arranged around the center an outer wall on each of said tubes, a plurality of layers of fabric intermediate the outer walls and tubes and a casing inclosing said core and to which the same is vulcanized.

5. In a resilient tire, a core comprising a mass of rubber or other suitable material, a central longitudinal tube extending therethrough, a plurality of layers of fabric in the walls of said tube, a tube coiled around said central tube and a tubular casing inclosing the core thus formed and vulcanized thereto, said casing comprising an outer and an inner layer of rubber and an intermediate layer of fabric.

6. In a vehicle-tire the combination with a tubular casing, comprising an inner and an outer layer of rubber and a layer of fabric intermediate the same of a core fitted in and vulcanized to the casing and comprising material such as rubber, an inner tube extending longitudinally of and at the axis of said material and comprising an outer and inner layer of rubber and an intermediate layer of canvas, said core thus formed having passages between the same and the casing and extending longitudinally thereof and an air-valve opening from its central tube through the outer casing.

7. A vehicle-tire, having a central core vulcanized therein and comprising in combination a mass of low-grade rubber having a plurality of channels in one side thereof, a plurality of independent tubes extending longitudinally of said mass and vulcanized therein and an air-valve opening into the center of the core thus formed.

8. In a vehicle-tire a core comprising a central tube a plurality of layers of canvas reinforcing the same an inner and an outer tube coiled to inclose the central tube, a plurality of layers of canvas between the same, and rubber filling the spaces between said coiled and central tubes and acting after vulcanization to bind the same together.

9. A vehicle-tire comprising an outer casing, a central reinforced tube therein, a smaller tube coiled to inclose said central tube, a mass of rubber molded on said tubes and vulcanized to the casing and provided with a plurality of channels in its outer periphery.

10. A vehicle-tire comprising an outer casing having a plurality of layers of canvas inclosed by rubber, a central reinforced tube, smaller tubes arranged about the same and a mass of rubber molded about said tubes and supporting the same centrally of the casing.

11. A vehicle-tire having an outer casing and interior tubes one arranged at the center of the tire, the others inclosed between the same and said casing, a plurality of layers of reinforcing fabric in the walls of each tube and a mass of rubber vulcanized to and about said interior tubes.

In testimony whereof I have hereunto subscribed my name in the presence of two subscribing witnesses.

JOHN F. RAU.

Witnesses:
C. W. HILLS,
W. W. WITHENBURY.